United States Patent [19]
Pitt

[11] Patent Number: 5,929,829
[45] Date of Patent: Jul. 27, 1999

[54] DISPLAY DEVICE HAVING DRIVE ELECTRODE WITH PROJECTIONS

[75] Inventor: Michael G. Pitt, Eindhoven, Netherlands

[73] Assignee: Flat Panel Display Co. B.V. (FPD), Eindhoven, Netherlands

[21] Appl. No.: 08/711,569

[22] Filed: Sep. 10, 1996

[30] Foreign Application Priority Data

Sep. 11, 1995 [EP] European Pat. Off. .............. 95202455

[51] Int. Cl.[6] .............................. G09G 3/36; G02F 1/343
[52] U.S. Cl. .............................................................. 345/87
[58] Field of Search ................................... 345/55, 58, 60, 345/74, 75, 76, 82–87, 90–92, 105–107; 349/40

[56] References Cited

U.S. PATENT DOCUMENTS

| | | | |
|---|---|---|---|
| 4,789,857 | 12/1988 | Maurice | 345/93 |
| 5,159,325 | 10/1992 | Kujik . | |
| 5,220,443 | 6/1993 | Noguchi | 349/40 |
| 5,373,377 | 12/1994 | Ogawa et al. | 349/40 |
| 5,497,146 | 3/1996 | Hebiguchi | 345/92 |
| 5,596,342 | 1/1997 | Ikezaki et al. | 345/87 |
| 5,668,032 | 9/1997 | Holmberg et al. | 349/40 |

*Primary Examiner*—Jeffery Brier
*Attorney, Agent, or Firm*—John C. Fox

[57] ABSTRACT

Display device having such electrically conducting patterns in the supply electrodes (4, 5) that flashover easily occurs between the supply electrodes (for example, pointed projections (3, 15)). Damage of switching elements (12, 23) due to electrostatic charge is thereby prevented.

8 Claims, 3 Drawing Sheets

DISPLAY DEVICE HAVING DRIVE ELECTRODE WITH PROJECTIONS

BACKGROUND OF THE INVENTION

The invention relates to a display device comprising an electrocotical medium between two substrates with a plurality of pixels arranged in rows and columns and, on a first substrate, at least a first group of electrodes for driving the pixels.

Said display devices are used, for example in television applications and data graphic display devices.

Display devices of the type described in the opening paragraph are generally known. A display device using two-pole switching elements (MIMs) is known, for example from U.S. Pat. No. 5,159,325. This Patent describes such a device in which a MIM (metal-isolator-metal) is arranged as a switching element between each pixel and a first group of electrodes, in this case the column electrodes. It is known that electrostatic charge may take place during manufacture of the supporting plates on which the switching elements are present (referred to as the active plates). Such a voltage difference may then be produced between the column electrodes that there is flashover between these column electrodes and switching elements may be damaged, while also the conducting tracks constituting the column electrodes may be damaged. The risk of damage due to fashover also applies to other switching elements.

In this Patent Application, a switching element is understood to mean both a two-pole and a three-pole switching element. Examples of two-pole switching elements are non-linear switching elements such as MIMs, diodes or varistors, but also linear switching elements. Examples of three-pole switching elements are TFTs.

To prevent said form of flashover, (series arrangements of) non-linear resistors are sometimes provided between the column electrodes.

Electrostatic flashover may also occur between the row electrodes which, dependent on the type of switching element (two-pole or three pole) used, are arranged on the same substrate or on the other substrate.

OBJECTS AND SUMMARY OF THE INVENTION

It is an object of the invention to provide a display device of the type described in the opening paragraph, in which damage due to electric discharge between row electrodes or between column electrodes is obviated as much as possible without the necessity of providing extra switching elements.

To this end, a display device according to the invention is characterized in that at least one electrode of at least each pair of juxtaposed electrodes of the drive electrode or of a drive electrode and an extra electrode on the first substrate is provided with electrically conducting projections, at the location whereof the voltage for electric flashover is lower than between other parts of the relevant pair of electrodes.

A too high voltage difference between the electrodes at the location of, for example MIMs or TFTs or other (switching) elements which are sensitive to flashover is thereby prevented.

The presence of the electrically conducting projections prevents a too high charge of the electrodes because, as it were, (sparkover) occurs between the projections and the juxtaposed electrode at a voltage which is lower than a voltage at which flashover occurs at other locations so that the (switching) elements may be damaged.

The electrically conducting projections are preferably provided at the periphery of the matrix of pixels. Although the mutual distance of the column or row electrodes in situ may be larger than at the area of the pixels, said flashover still occurs first at the location of the projections, notably when tapered projections are used (at an angle up to 90 degrees, apart from small roundings as a result of the photolithographic process).

The tapered projections may be realised in different manners.

A first embodiment of a display device according to the invention is characterized in that, in a plan view, an electrode has a trangular part on at least one side, the base of the triangle extending parallel to the electrode direction and the apex angle facing away from the electrode.

In this embodiment, two juxtaposed electrodes preferably have triangular parts facing each other.

A further embodiment of a display device according to the invention is characterized in that, in a plan view, two juxtaposed electrodes comprise conductors of triangular parts facing each other.

In the latter two cases, the electric discharge is limited to the facing triangular parts.

These and other aspects of the invention will be apparent from and elucidated with reference to the embodiments described hereinafter.

BRIEF DESCRIPTION OF THE DRAWINGS

In the drawings.

The Figures are diagrammatic and not to scale. Corresponding parts are generally denoted by the same reference numerals.

DETAILED DESCRIPTION OF THE PREFERRED EMBODIMENTS

Figure 1:
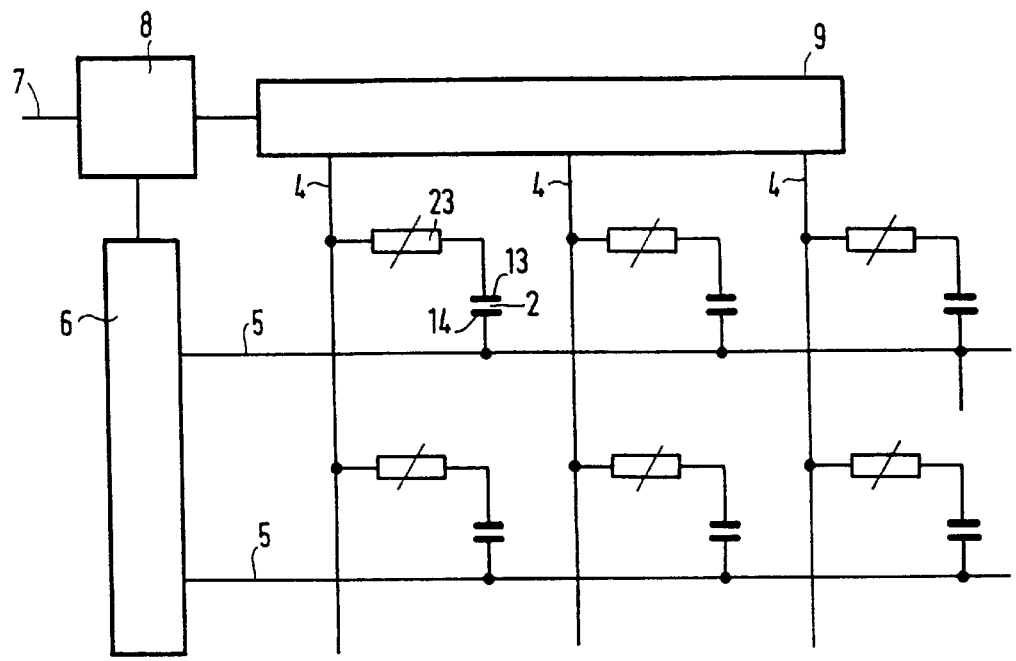
FIG. 1 is a diagrammatic equivalent circuit diagrm of a display device according to the invention.

FIG. 1 is a diagrammatic equivalent circuit diagram of a part of a display device 1. This device comprises a matrix of pixels 2 arranged in rows and columns. In this embodiment, the pixels 2 are connected to column electrodes (data electrodes) 4 via two-pole switches, which are MIMs 23 in this embodiment. A row of pixels is selected via row electrodes (selection electrodes) 5 which select the relevant row. The row electrods 5 are successively selected by means of a multiplex circuit 6.

Incoming (video) information 7 is stored in a data register 9 after it may have been processed in a processing/drive unit 8. The voltages presented by the data register 9 cover a voltage range which is sufficient to set the desired scale of grey levels. In this embodiment the picture electrodes 14 constitute a common row electrode S.

Figure 2:
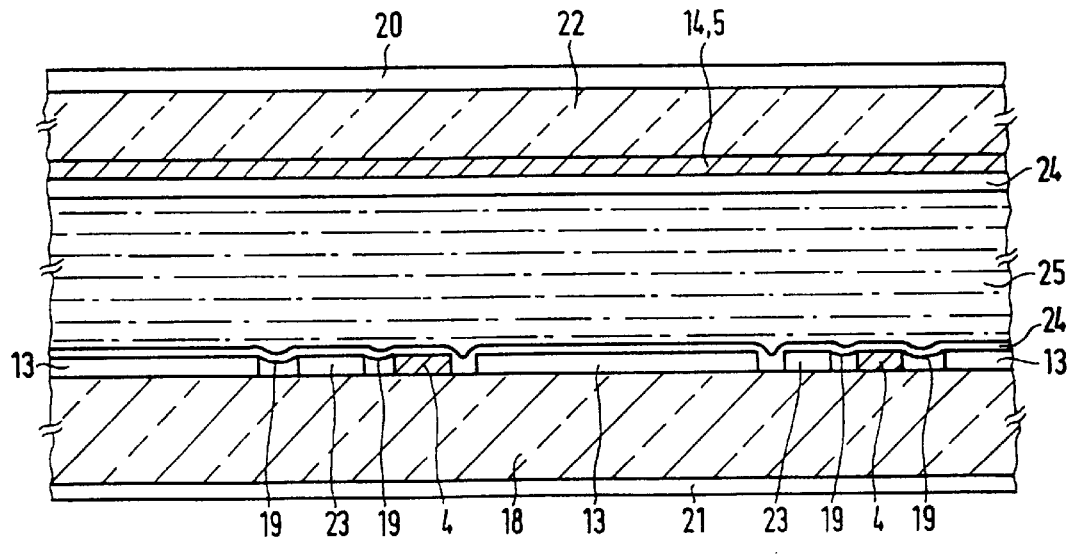
FIG. 2 is a diagrammatic cross-section of a display device according to the invention.

FIG. 2 is a diagrammatic cross-section of the device shown in FIG. 1. A first substrate 18 is provided with column electrodes 4 and picture electrodes 13, in this embodiment of transparent conducting material, for example indium tin oxide, which are connected to the column electrodes 4 via the MIMs 23 by means of connections 19 (shown diagrammatically).

A second substrate 22 is provided with picture electrodes 14 which, in this embodiment, are integrated to form a common row electrode 5. The two substretes are also coated with orienting layers 24, while a liquid crystal material 25 is present between the substrates. Possible spacers and the sealing edge are not shown in FIG. 2. The device also comprises a first polarizer 20 and a second polarizer or analyzer 21 whose axes of polarization cross each other perpendicularly.

Figure 3:
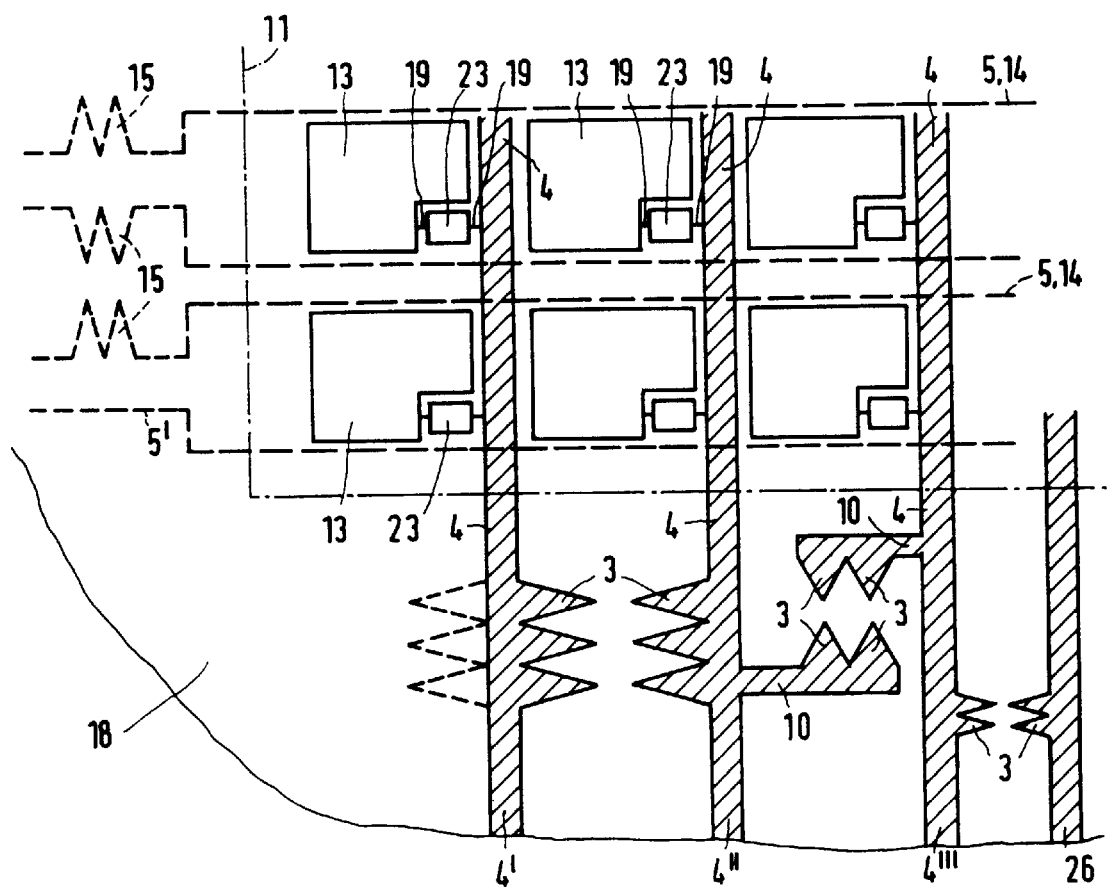
FIG. 3 is a diagrammatic plan view of a display device according to the invention.

FIG. 3 is a plan view of a part of the device shown in FIGS. 1, 2. The row electrodes 5, 14 situated on the substrate 22 are denoted by means of broken lines. The Figure further shows the column electrodes 4 situated on the substrate 18, and the picture electrodes 13 and (diagrammatically) the MIMs 23 which connect these picture electrodes to the column electrodes 4. The sealing edge, within which the liquid crystal matial is present, is shown diagrammatically by means of a dot-and-dash line 11.

According to the invention, each column electrode 4', 4" has triangular projections 3 (three in this embodiment), with the bases of the triangles extending parallel to the electrode direction in this embodiment and the apex angles facing away from the respective electrodes. The acute apex angles of the triangles acociated with the juxtaposed electrodes 4', 4" therefore face each other. It is thereby achieved that an electric discharge between these apex angles is generated before electric flashover between the electrodes 4' and 4" occurs at another location. The same effect is achieved with the configuration between the electrodes 4" and 4", in which conductors 10 (made or not made of the same material as the electrodes 4) are also provided with triangular projections 3.

To obtain a discharge at a sufficiently low voltage, the triangles preferably have an apex angle which is smaller than 90 degrees.

The triangular projections 3 are located outside the area filled with liquid crystal material (which area is bounded by the line 11) so that a possible discharge cannot affect the properties of the liquid crystal material. Moreover, the provision of the projections is not at the expense of space within the area filled with liquid crystal material; the measure thus does not have any influence on the aperture.

The electrodes 5, 14 on the other substrate 22 may be provided with projections 15 (shown by means of broken lines) in the same manner. Outside the area enclosed by the edge 11, these electrodes may be narrower, if necessary (which is denoted by means of the reference numeral 5').

Figure 4:
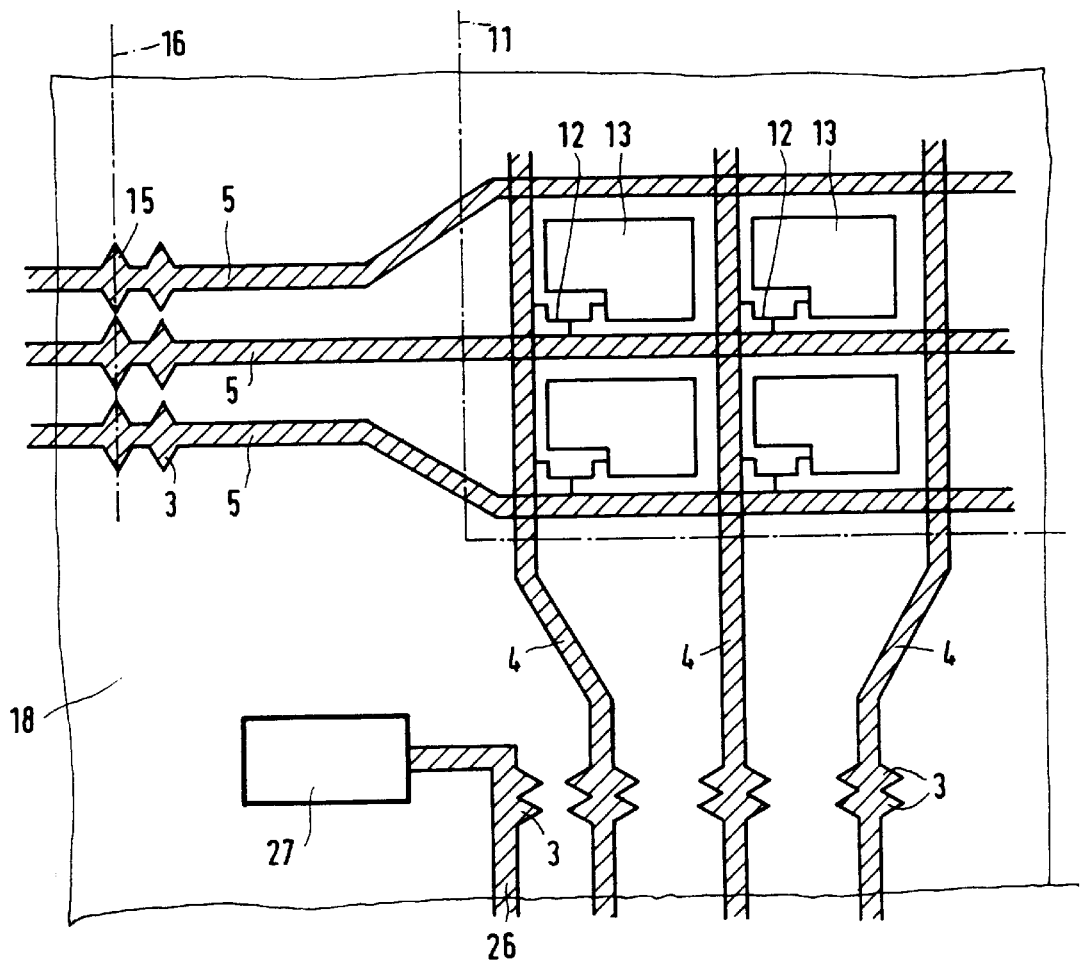
FIG. 4 shows a part of another display device according to the invention.

FIG. 4 is a plan view of an embodiment in which TFTs 12 are used as switching elements. The row electrodes 5 and column electrodes 4 are now present on one substrate 18 and are mutually insulated at the location of their crossings. The picture electrodes 13 are provided with a voltage via the electrodes 4, 5 and the TFTs 12. The other substrate is provided, for example with one counter electrode. The electrodes 4, 5 are also provided with triangular projections 3, 15. As is apparent from FIG. 4, the angles of the triangular parts (15) facing away from the electrodes are substantially in alignment (16), transverse to the direction of the electrodes (5).

The invention is of course not limited to the embodiments shown, but may also be used in display devices other than those based on liquid crystal material. It may also be used, for example for LCD panels which are addressed in different manners, for example via optical or thermal addressing or via plasma discharges in parallel ducts on a first substrate. The electrodes shown here are then used, for exnample for the electrodes for presenting information (on the other substrate).

In the embodiment shown in FIG. 1, the rows and columns may be interchanged. Said measures may also be used to prevent flashover between the column or row electrodes and extra electrodes provided on the substrates 18, 22. For example, FIG. 3 shows an extra electrode 26 which is connected, for example to a sensor (not shown) in the liquid crystal material. Simlarly as described above, the electrode 26 is also provided with projections 3. The same applies to the extra electrode 26 in FIG. 4 which is connected to drive electronics 27 shown diagrammatically.

In summary, the invention relates to the provision of extra electrically conducting patterns, for example in the form of pointed projections, in supply electdes in such a way that flashover easlly occurs between the supply electrodes. Damage of switching elements due to electrostatic charge is then prevented.

I claim:

1. A display device comprising an electroptical medium between two substrates with a plurality of pixels arranged in rows and columns and, on a first substrate, at least a first group of electrodes for driving the pixels, characterized in that at least one electrode of at least each pair of juxtaposed electrodes of the drive electrodes or of a drive electrode and an extra electrode on the first substrate is provided with electrically conducting projections, the voltage for electric flashover at the location of said projections is lower than between other parts of the relevant pair of electrodes.

2. A display device as claimed in claim 1, characterizd in that the display device comprises a group of row electrodes and a group of column electrodes for driving the pixels, and comprises a group of extra electrodes and in that at least one electrode of at least each juxtaposed pair of at least one of said groups of electrodes and the extra electrodes is provided with at least one electrically conducting projection which is tapered towards the other electrode.

3. A display device as claimed in claim 1, characteried in that the projection is tapered and between the sides of the projection has a maximum angle of 90 degrees.

4. A display device as claimed in claim 1, characterized in that an electrode has a triangular part on at least one side, the base of the triangle extending parallel to the electronde direction and the apex angle facing away from the electrode.

5. A display device as claimed in claim 4, characterized in that the electrodes have triangular parts on both sides.

6. A display device as claimed in claim 4, characterized in that two juxtaposed electrodes have triangular parts facing each other.

7. A display device as claimed in claim 3, characterized in that angles of the triangular parts facing away from the electrodes are substantially in alignment, transverse to the direction of the electrodes.

8. A display device as claimed in claim 4, characterized in that two juxtaposed electrodes comprise conductors of triangular parts facing each other.

* * * * *